United States Patent [19]
Ernst et al.

[11] Patent Number: 5,932,514
[45] Date of Patent: *Aug. 3, 1999

[54] PROCESS FOR PREPARING CATALYST SUPPORTS AND SUPPORTED POLYOLEFIN CATALYSTS AND ALSO THEIR USE FOR THE PREPARATION OF POLYOLEFINS

[75] Inventors: Eberhard Ernst, Katsdorf; Jens Reussner, Traun, both of Austria

[73] Assignee: Borealis AG, Austria

[ * ] Notice: This patent issued on a continued prosecution application filed under 37 CFR 1.53(d), and is subject to the twenty year patent term provisions of 35 U.S.C. 154(a)(2).

[21] Appl. No.: 08/790,849

[22] Filed: Feb. 3, 1997

[30] Foreign Application Priority Data

Feb. 2, 1996 [AT] Austria ........................................ 188/96

[51] Int. Cl.⁶ ............................... B01J 21/04; B01J 21/08
[52] U.S. Cl. .......................... 502/439; 502/152; 502/407; 502/415; 526/160; 526/943
[58] Field of Search ..................................... 502/107, 152, 502/155, 156, 405, 407, 415, 439

[56] References Cited

U.S. PATENT DOCUMENTS

| | | | |
|---|---|---|---|
| 5,001,205 | 3/1991 | Hoel | 526/128 |
| 5,057,475 | 10/1991 | Canich et al. | 502/104 |
| 5,278,264 | 1/1994 | Spaleck et al. | 526/127 |
| 5,329,033 | 7/1994 | Spaleck et al. | 556/53 |
| 5,380,687 | 1/1995 | Mangold et al. | 501/128 |
| 5,468,702 | 11/1995 | Jejelowo | 502/104 |
| 5,625,015 | 4/1997 | Brinen et al. | 526/160 |

FOREIGN PATENT DOCUMENTS

| | | |
|---|---|---|
| 1317411 | 4/1993 | Canada . |
| 0 206 794 | 12/1986 | European Pat. Off. . |
| 0 283 739 | 9/1988 | European Pat. Off. . |
| 0 302 424 | 2/1989 | European Pat. Off. . |
| 0 351 391 | 1/1990 | European Pat. Off. . |
| 0 485 822 | 5/1992 | European Pat. Off. . |
| 0 530 647 | 3/1993 | European Pat. Off. . |
| 0 563 917 | 10/1993 | European Pat. Off. . |
| 0 574 597 | 12/1993 | European Pat. Off. . |
| 0 578 838 | 1/1994 | European Pat. Off. . |
| 0 585 544 | 3/1994 | European Pat. Off. . |
| 0 685 494 | 12/1995 | European Pat. Off. . |
| 685494 | 12/1995 | European Pat. Off. . |
| 0 692 505 | 1/1996 | European Pat. Off. . |
| 0 754 706 | 1/1997 | European Pat. Off. . |
| 870 242 | 3/1953 | Germany . |
| 952 891 | 11/1956 | Germany . |
| 41 39 262 | 6/1993 | Germany . |
| 19527047 | 1/1997 | Germany . |
| WO91/09882 | 7/1991 | WIPO . |

OTHER PUBLICATIONS

T. Tsutsui et al., *Polymer*, 32(14), 2671–2673 (1991).

*Primary Examiner*—David W. Wu
*Attorney, Agent, or Firm*—Wenderoth, Lind & Ponack, L.L.P.

[57] ABSTRACT

A process for preparing a catalyst support in which a hydrophilic inorganic oxide of an element of main groups II to IV or transition group IV of the Periodic Table or a mixture or mixed oxide thereof is dried at from 110 to 800° C., subsequently reacted, if desired, with aluminoxanes or aluminum alkyls and subsequently reacted simultaneously with aluminoxanes and polyfunctional organic crosslinkers. In a further stage, the catalyst support can be brought into contact with a polyolefin catalyst, giving a supported polyolefin catalyst which is used, in particular, for the polymerization of olefins.

3 Claims, No Drawings

PROCESS FOR PREPARING CATALYST SUPPORTS AND SUPPORTED POLYOLEFIN CATALYSTS AND ALSO THEIR USE FOR THE PREPARATION OF POLYOLEFINS

The invention relates to catalyst supports based on inorganic oxides, supported polyolefin catalysts prepared for using these catalyst supports and also their use in olefin polymerization.

Polypropylene can be prepared, for example as described in EP-A-530 647, by the use of polyolefin catalysts comprising a metallocene and an activator or cocatalyst such as methylaluminoxane (MAO) or a perfluorotetraphenylborate. However, use of such homogenous catalysts in the polymerization gives powders having only a low bulk density. The particle morphology of such products can in principle be somewhat improved by a specific pretreatment of the metallocene with the cocatalyst (EP-302 424). However, such a process has the disadvantage of, in particular, heavy deposit formation in industrial reactors (EPA 563 917).

Although the use of methylaluminoxane, which is insoluble in aliphatic solvents, as support material does give a certain improvement in the activity, it likewise leads to pulverulent products (Polymer 1991, Vol. 32, 2671–2673); in addition, the process is uneconomical.

Supporting the metallocene on oxidic materials such as silicon oxide or aluminum oxide with pretreatment of the starting material, which may be partially dehydrated, with the cocatalyst is a method known from WO 91/09882 which is used in homopolymerization and copolymerization of ethylene. However, in this method, the particle size of the polymer particle is determined essentially by the particle size of the support material so that limits are placed on an increase in particle size compared with conventional catalysts supported on magnesium chloride. Further processes describe the modification of the oxidic support using MAO and the subsequent application of the metallocene (EPA 0206794). However, this method restricts the ability to control the particle size by means of the properties of the support material.

EP-A-685494 describes a further supported catalyst which is prepared by the application of methylaluminoxane to a hydrophilic oxide, subsequent crosslinking of the MAO using a polyfunctional organic crosslinker and subsequent application of an activated MAO/metallocene complex. A disadvantage of this supported catalyst is that at the relatively high polymerization conversions achieved in industrial plants the strength of the supported catalyst is not sufficient to ensure a compact, granular morphology of the polymer product. The result is a lowering of the bulk density and an increase in the proportion of fines, which causes considerable problems from a technical point of view.

It is therefore an object of the invention to develop a process which allows the preparation of a supported polyolefin catalyst which can be used for the polymerization of olefins and avoids the disadvantages described even at high polymerization conversions.

Surprisingly, it has now been found that when a specific support material is used and the catalyst is subsequently fixed to the support, the use of these supported polyolefin catalysts in the polymerization of olefins gives high polymerization conversions and bulk densities of the products and the particle size and particle size distribution of the polymers can be set in a targeted way.

The present invention accordingly provides a process for preparing a catalyst support, which comprises a) drying a hydrophilic inorganic oxide of an element of main groups II to IV or transition group IV of the Periodic Table or a mixture or mixed oxide thereof at from 110 to 800° C., subsequently b) if desired reacting the free hydroxyl groups of the oxide completely or partially with aluminoxanes or aluminum alkyls and subsequently c) reacting the oxide simultaneously with aluminoxanes and polyfunctional organic crosslinkers.

The hydrophilic, hydroxyl-containing oxides used usually contain water. They are preferably macroporous and finely divided and usually have a mean particle size of from 10 to 300 microns, preferably from 30 to 100 microns. The support oxides are commercially available; preference is given to using aluminum oxide, silicon oxide, magnesium oxide, titanium oxide and zirconium oxide. Particular preference is given to using silicon dioxides of the Grace Davison type. However, other suitable starting materials are finely divided oxides, for example those described in DE-C 870 242 or EP-A-585 544, which are prepared by the high-temperature hydrolysis method from gaseous metal chlorides or silicon compounds.

The invention also provides the catalyst support prepared by the process of the invention. The catalyst support of the invention is prepared from a hydrophilic inorganic oxide in a multistage reaction.

In the first stage (a), the oxide is dehydrated in a stream of nitrogen or under reduced pressure at temperatures of from 110 to 800° C. over a period of from 1 to 24 hours. The concentration of free hydroxyl groups established as a function of the drying temperature selected is then measured. The free hydroxyl groups can be reacted completely or partially with aluminoxanes or aluminum alkyls in stage (b).

In stage (c), the dried oxide is reacted simultaneously with aluminoxanes and at least one polyfunctional organic crosslinker, with it being suspended, for example, in a suitable hydrocarbon solvent such as toluene in such a way that it is covered with the solvent. The solvents for the aluminoxane and for the crosslinker have to be miscible and the same solvents are preferably used. Particular preference is given to using toluene.

According to the present invention, the aluminoxane used is one of the formula I $$R_2Al\text{-}[\text{-}O\text{-}AlR\text{-}]_n\text{-}O\text{-}AlR_2 \tag{I}$$

for the linear type and/or the formula II $$[\text{-}O\text{-}AlR\text{-}]_{n^+} \tag{II}$$

for the cyclic type, where, in the formulae I and II, the radicals R can be identical or different and are each a $C_1$–$C_6$-alkyl group and n is an integer in the range 1–50. Preferably, the radicals R are identical and are methyl, isobutyl, phenyl or benzyl. The aluminoxane can be prepared in various ways by known methods. One possibility is, for example, the reaction of aluminum alkyls with aluminum sulfate containing a water of crystallization (Hoechst EP-A-302424). In the present invention, preference is given to using commercial methylaluminoxane (MAO, from Witco) which is dissolved in toluene.

In the preparation of the catalyst support, the molar ratio of aluminum (as aluminoxane) to surface hydroxyl groups is between 1 and 50, preferably between 1 and 30, particularly preferably between 5 and 20.

To prepare the solution needed in stage c), the solvent used for the crosslinker can be the same as for the MAO solution. Owing to the temperature dependence of the solubility of these crosslinkers in the solvent used, the desired concentration can be set in a targeted manner by the choice of the temperature of the solution. Particularly advantageous is the selection of a solvent whose boiling point is below the decomposition temperature of the solid prepared in stage c). Preference is given to using aromatic solvents such as xylene, benzene or toluene. Toluene is particularly suitable.

Suitable polyfunctional organic crosslinkers to be used according to the invention are all organic compounds having more than one functional group which can react with a metal-carbon bond. Preference is given to using a bifunctional crosslinker. Such bifunctional organic compounds can be, for example, aliphatic or aromatic diols, aldehydes, dicarboxylic acids, primary or secondary diamines, diepoxy compounds. To avoid interfering secondary reactions or reaction products which would require additional purification, preference is given to using aliphatic and aromatic diols, secondary amines or diepoxy compounds or mixtures thereof. Particular preference is given to using ethylene glycol, butanediol, bisphenol A and 1,4-butanediol diglycidyl ether. Tri- or higher-functional crosslinkers which can be used are, for example, triethanolamine, glycerol, phloroglucinol or tetraethylenepentamine.

When using the polyfunctional crosslinkers, it is also possible, in a further reaction stage, to deactivate unreacted reactive groups using, for example, alkylaluminum compounds, preferably using trimethylaluminum.

The molar ratio between the aluminum used in stage c) as aluminoxane and the crosslinker can vary within a wide range and is between 1 and 100, preferably between 1 and 40, particularly preferably between 10 and 25. It is dependent, in particular, on the type and pretreatment of the metal oxides, the type of aluminoxanes used, on the respective molar ratio of Al (as aluminoxane) to the surface hydroxyl groups on the metal oxide and on the type of crosslinker. Higher molar ratios of Al to crosslinker are used particularly when use is made of tri- or higher-functional crosslinkers which can form a correspondingly higher number of crosslinks.

The suspended dried oxide from the stage a) is preferably treated with a solution of aluminoxane and a solution of one or more polyfunctional organic crosslinkers in the same solvent. If desired, it is also possible in stage b) to react the free hydroxyl groups of the oxide with an up to equimolar amount of an aluminoxane or an aluminum alkyl solution, for example trimethylaluminium, prior to the crosslinking reaction. Preference is given to using MAO for this purpose. It has been found to be particularly advantageous if all hydroxyl groups have been reacted. However, even a partial reaction of these groups gives a positive effect.

The metering in of the solutions is carried out simultaneously and continuously and the crosslinker solution is heated/cooled if desired. The temperature to which the solution is heated/cooled depends on the solubility of the crosslinker in the solvent selected and on the desired crosslinking density on the support surface. The rate at which the two streams are metered in can be set by means of metering pumps and is in a range between 0.1 and 1000 ml per minute, preferably between 0.5 and 250 ml per minute, particularly preferably between 1 and 50 ml per minute. The reaction is preferably carried out in such a way that all the MAO has been reacted after the simultaneous metering in of the two solutions. Under some circumstances, fluctuations in the reaction conditions on the industrial scale can lead to unreacted MAO remaining in the solution. The usable catalyst supports as described in EP-A-685494 display a soluble Al proportion in the solvent used of preferably less than 1.4 mol % based on MAO used. In this case, it is possible to carry out one or more washing steps in order to reduce the concentration to below the desired limit.

After metering in is complete, the reaction mixture is stirred further for about 60 minutes and the solvent is then removed. The residue can be dried under reduced pressure, but it is preferably used further in the moist state.

The catalyst support prepared by the process of the invention can advantageously be used for the preparation of a supported polyolefin catalyst.

The invention accordingly also provides a supported polyolefin catalyst comprising the reaction product of (A) an above-described catalyst support according to the invention with (B) a polyolefin catalyst or a mixture of a plurality of polyolefin catalysts. Possible polyolefin catalysts are, for example, metallocenes, with it being possible in principle to react any metallocene or mixture of metallocenes. Possible metallocenes are, for example, unbridged, unsubstituted or substituted cyclopentadienyl, indenyl and fluorenyl compounds of metals of group IVb, Vb or VIb of the Periodic Table, for example bis(1,2-dimethylcyclopentadienyl) zirconium dichloride (EP-A-283739); bridged, unsubstituted or substituted, asymmetric or symmetric cyclopentadienyl, indenyl and fluorenyl compounds of metals of group IVb, Vb or VIb of the Periodic Table, for example dimethylsilanediylbis(indenyl)zirconium dichloride (EP-A-574597), dimethylsilanediylbis(2-methylindenyl)zirconium dichloride (EP-A-485822), bis (trimethylsilyl)silanediylbis(2-methylindenyl)zirconium dichloride (German Application 19527047) or isopropylidene(cyclopentadienyl)(fluorenyl)zirconium dichloride (EP-A-351391).

The supported metallocene catalyst is prepared by suspending the catalyst support of the invention in an inert hydrocarbon, preferably toluene, and bringing it into contact with the metallocene. In this procedure, the metallocene is, dissolved, for example, in an inert hydrocarbon. Inert solvents which can be used are, for example, aliphatic or aromatic hydrocarbons, preferably toluene. The metallocenes are preferably used in an amount of from 0.3% by mass to 5% by mass based on the total mass of the supported catalyst. The mixing time is from 5 minutes to 24 hours, preferably from 1 to 6 hours. The mixing is carried out at a temperature of from −10 to +80° C., in particular from 20 to 70° C. The application of the metallocene is preferably carried out subsequent to the synthesis of the support in order to save a drying step. After the reaction is complete, the solvent is decanted and taken off under reduced pressure until a free-flowing solid remains.

The metallocene content of the supported catalyst is in the range from 0.01 to 5% by weight, preferably from 0.1 to 3% by weight, based on the mass of the supported catalyst.

Also possible are polyolefin catalysts based on transition metal salts of transition groups IV to VIII of the Periodic Table of the Elements, as are known, for example, as Ziegler/Natta catalysts and described, for example, in the European Patent Application 95110693.

The invention further provides a process for preparing polyolefins by polymerization or copolymerization of olefins, wherein the polymerization catalyst used is the supported polyolefin catalyst of the invention, and also provides for the use of supported polyolefin catalysts according to the invention in the polymerization or copolymerization of olefins for preparing polyolefins.

The supported catalyst of the invention can be introduced into the polymerization mixture either as a powder or as a suspension in an inert hydrocarbon, for example pentane, hexane, cyclohexane or a mineral oil.

The polymerization is carried out in a known manner by a solution, suspension or gas-phase process, continuously or batchwise at a temperature of from −10 to +200° C., preferably from +20 to +80° C.

The supported catalyst of the invention is polymerization-active without further activating additives. However, it has been found to be particularly advantageous to use aluminum alkyls, preferably trimethylaluminum, triethylaluminum or triisobutylaluminum, as scavenger and as additional activator. The amount used is, based on the aluminum, 50–5000 mol, preferably 100–500 mol, per mol of transition metal of the polyolefin catalyst.

Polymerization or copolymerization is carried out on olefins of the formula $R^a$—CH=CH—$R^b$. In this formula, $R^a$ and $R^b$ are identical or different and are each a hydrogen atom or an alkyl radical having from 1 to 20 carbon atoms. However, $R^a$ and $R^b$ together with the carbon atoms connecting them can also form a ring. For example, olefins such as ethylene, propylene, 1-butene, 1-hexene, 4-methyl-1-pentene, 1-octene, cyclopentene, norbornene or norbornadiene are polymerized or copolymerized. Preference is given to polymerizing or copolymerizing ethylene, propylene and butene, particularly preferably ethylene and propylene.

If required, hydrogen is added as molecular weight regulator. The total pressure in the polymerization is usually 0.5–150 bar. Polymerization is preferably carried out in the pressure range of 1–40 bar.

If the polymerization is carried out as a suspension or solution polymerization, an inert solvent is used. For example, aliphatic or cycloaliphatic hydrocarbons such as pentane, hexane or cyclohexane can be used. It is also possible to use toluene. Preference is given to carrying out the polymerization in the liquid monomer.

In the copolymerization of ethylene with propylene, the polymerization is preferably carried out in liquid propylene or in hexane as suspension medium. In the polymerization in liquid propylene, the ethylene is preferably fed in an amount such that a partial pressure ratio $P_{C3}/P_{C2}>0.5$, in particular >1.0, is established over the liquid phase ($P_{C2}$=partial pressure of the ethylene in the gas phase over the suspension; $P_{C3}$=partial pressure of the propylene in the gas phase over the suspension). In the copolymerization in hexane as suspension medium, an ethylene/propylene gas mixture having a propylene content of from 1 to 50 mol %, preferably from 5 to 30 mol %, is fed in. The total pressure is kept constant during the polymerization by metering in a further amount. The total pressure is from 0.5 to 40 bar, preferably from 1 to 20 bar. The polymerization time is from 10 minutes to 6 hours, preferably from 30 minutes to 2 hours.

The supported catalysts used according to the invention make possible the preparation of homopolymers, copolymers and block copolymers. Their use makes it possible to control the particle size of the polymers in a targeted manner as a function of the preparation conditions used for the support. The particular advantage of the catalyst of the invention is therefore the factor that the particle size of the polymers can be matched to the respective requirements of the technology used.

Apart from the opportunity of controlling the particle size and the particle size of distribution in a targeted manner, the process of the invention has the further advantage that the polyolefins are obtained in granular form and that, in particular as high polymerization conversions too, they have a high bulk density and a low fines content.

Further advantages are given by the preparation technology. The catalyst can, in principle, be prepared by a "single-vessel process"; with an appropriate reaction procedure, no interfering by-products are formed and the solvents used are recyclable.

The following examples illustrate the invention.

Abbreviations used are:

MC Metallocene
MAO Methylaluminoxane
TIBAL Triisobutylaluminum
$M_w$ Weight average molar mass in g/mol determined by GPC
$M_n$ Number average molar mass in g/mol determined by GPC
$M_w/M_n$ Polydispersity
$d_{50}$ Mean particle diameter determined by sieve analysis
$T_m$ Melting point determined by DSC.

EXAMPLE 1

Preparation of the Supported Catalyst A 15 g of silicon dioxide (Grace grade 955 W) were dried at 200° C. in a drying tube under a countercurrent of nitrogen over a period of 4 hours. The OH content was 1.83 mmol/g of $SiO_2$.

3.3 g of the dried oxide were suspended in 60 ml of dry toluene in a three-neck flask equipped with a stirrer and two dropping funnels. In the first dropping funnel, 6.27 g (30.2 mmol of Al) of a 30% strength solution of methylaluminoxan in toluene were mixed with 95 ml of toluene and the second dropping funnel was charged with 100 ml of a solution of bisphenol A and oxygen-free toluene (total bisphenol content: 275.8 mg of bisphenol A; 1.208 mmol). After 20 ml of the MAO solution had been initially introduced into the suspension with moderate stirring, the two solutions were simultaneously added dropwise. The stirrer speed during this procedure was 200 rpm. The rate of dropwise addition was low and was selected such that both solutions were consumed at a suitable decrease in volume. The suspension was subsequently stirred for a further hour and was then allowed to stand. A fine white solid settled out. The supernatant toluene was removed, the residue was again taken up with toluene and washed for 15 minutes at 70° C. The Al content of the washing solution was 0.08 mol % (based on mol of Al used). After removing the supernatant washing solution, a solution comprising 0.096 mmol of bis(trimethylsilyl)silanediylbis (2-methylindenyl) zirconium dichloride (prepared as described in German Application 19527047) and 60 ml of toluene was added. The suspension became a deep orange and this color became increasingly intense during the course of the stirring phase. After 10 hours, the stirrer was switched off and the supernatant clear solution no longer showed any discoloration. Removal of the solvent at 50° under reduced pressure gave a red/orange finely divided solid.

EXAMPLE 2

Polymerization using Supported Catalyst A

A 2 l stirred reactor (from Büchi) was, after being made inert, charged at room temperature with 1.2 ml of a 1 molar triisobutylaluminum/hexane solution and 200 g of liquid propylene and the mixture was stirred for 3 minutes at 350 rpm.

110 mg of the supported catalyst A prepared in Example 1 were rinsed into the reactor using a further 300 g of propylene, the stirrer speed was increased to 700 rpm, the mixture was heated over a period of 15 minutes to the polymerization temperature of 70° C. and the temperature was kept constant. The reaction was stopped after two hours by flashing off the propylene. This gave 220 g of polypropylene having a mean particle diameter $d_{50}$ determined by sieve analysis of 315 µm and a fines content (<100 µm) of 1.5% by weight. The activity was 2 kg/g of supported catalyst. The polymer particles were granular ($M_w$=385,000 g/mol; polydispersity 2.5; $T_m$=147° C.) and the reactor showed no wall deposits.

EXAMPLE 3

Preparation of the Supported Catalyst B

The supported catalyst B was prepared by a method similar to the supported catalyst preparation in Example 1. 2.97 g of the dried oxide were suspended in 60 ml of dry toluene. In the first dropping funnel, 11.3 g (54.4 mmol of Al) of a 30% strength solution of methylaluminoxane in toluene were mixed with 190 ml of toluene; the second dropping funnel was charged with 200 ml of a solution of bisphenol A and toluene (total bisphenol content: 558.85 mg of bisphenol A; 2.448 mmol). After 50 ml of the MAO solution had been initially introduced into the suspension with moderate stirring, the two solutions were simultaneously slowly added dropwise. After the reaction was complete, the mixture was stirred for one hour and then washed twice with toluene. After removing the supernatant washing solution, a solution comprising 0.133 mmol of dimethylsilanediylbis(2-methylindenyl)zirconium dichloride (from Boulder Scientific Company) and 80 ml of toluene was added. After 10 hours, the stirrer was switched off. After removing the supernatant solution, the solid was washed twice more with toluene and subsequently dried at 50° under reduced pressure.

EXAMPLE 4

Polymerization using Supported Catalyst B

The polymerization was carried out using a method similar to Example 2, but using 67 mg of the supported catalyst B and 1.2 ml of a 1 molar TIBAL/hexane solution.

This gave 114 g of polypropylene having a mean particle diameter $d_{50}$ determined by sieve analysis of 500 µm and a fines content (<100 µm) of 0.8% by weight. The yield was 1.7 kg/g of supported catalyst. The polymer particles were granular ($M_w$=307,000 g/mol; polydispersity 2.3; $T_m$=147° C.).

EXAMPLE 5

Polymerization using the Supported Catalyst B

A 20 l stirred reactor was, after being made inert, charged at room temperature with 14 ml of a 1 molar triisobutylaluminum/hexane solution and 6500 g of liquid propylene and the mixture was stirred for 5 minutes at 300 rpm.

335 mg of the supported catalyst B prepared in Example 3 were rinsed into the reactor with a further 500 g of propylene, the stirrer speed was increased to 400 rpm and the mixture was heated over a period of 20 minutes to the polymerization temperature of 70° C. which was then kept constant. The reaction was stopped after two hours by flashing off the excess monomer. This gave 856 g of polypropylene having a mean particle diameter $d_{50}$ determined by sieve analysis of 500 µm and a fines content (<100 µm) of 0.35% by weight. The activity was 2.14 kg/g of supported catalyst. The polymer particles were granular and free flowing ($M_w$=316,000 g/mol; polydispersity 2.4; $T_m$=147° C.) and the reactor showed no wall deposits.

EXAMPLE 6

Polymerization using the Supported Catalyst B

A 20 l stirred reactor was, after being made inert, charged at room temperature with 3 ml of a 1 molar triisobutylaluminum/hexane solution and 6500 g of liquid propylene and the mixture was stirred for 5 minutes at 300 rpm.

408 mg of the supported catalyst B prepared in Example 3 were rinsed into the reactor with a further 500 g of propylene, the stirrer speed was increased to 400 rpm and the mixture was heated over a period of 20 minutes to the polymerization temperature of 70° C. which was then kept constant. The reaction was stopped after two hours by flashing off the excess monomer. This gave 1023 g of polypropylene having a mean particle diameter $d_{50}$ determined by sieve analysis of 500 µm and a fines content (<100 µm) of 0.2% by weight. The activity was 2.5 kg/g of supported catalyst. The polymer particles were granular and free flowing ($M_w$=301,000 g/mol; polydispersity 2.5; $T_m$=147° C.) and the reactor showed no wall deposits.

EXAMPLE 7

Preparation of the Supported Catalyst C 12 g of silicon dioxide (Grace grade 955 W) were dried at 120° C. in a drying tube under a countercurrent of nitrogen over a period of 4 hours. The OH content was 2.26 mmol/g of $SiO_2$.

2.97 g of the dried oxide were suspended in 60 ml of dry toluene in a three-neck flask equipped with a stirrer and two dropping funnels. In the first dropping funnel, 8.45 g (40.69 mmol of Al) of a 30% strength solution of methylaluminoxane in toluene were mixed with 100 ml of toluene and the second dropping funnel was charged with 180 ml of a solution of bisphenol A and oxygen-free toluene (total bisphenol content: 459 mg of bisphenol A; 2.01 mmol). After 20 ml of the MAO solution had been initially introduced into the suspension with moderate stirring, the two solutions were simultaneously added dropwise. The stirrer speed during this procedure was 200 rpm. The rate of dropwise addition was low and was selected such that both solutions were consumed at a suitable decrease in volume. The suspension was subsequently stirred for a further hour and was then allowed to stand. A fine white solid settled out. The supernatant toluene was removed, the residue was again taken up with toluene and washed for 15 minutes at 70° C. The Al content of the washing solution was 0.09 mol % (based on mol of Al used). After removing the supernatant washing solution, a solution comprising 0.102 mmol of dimethylsilanediylbis(2-methylindenyl)zirconium dichloride (from Boulder Scientific Company) and 60 ml of toluene was added. The suspension became orange and this color became increasingly intense during the course of the stirring phase. The mixture was stirred for 5 hours at 70° C., the supernatant clear solution was then removed and the solid was washed again with toluene at 70° C. The residue was subsequently dried at 50° C. under reduced pressure, leaving a red/orange finely divided solid.

EXAMPLE 8

Polymerization using the Supported Catalyst C

The polymerization was carried out using a method similar to Example 2, but using 68 mg of the supported catalyst C and 0.8 ml of a 1 molar TIBAL/hexane solution.

This gave 80 g of polypropylene having a mean particle diameter $d_{50}$ determined by sieve analysis of 400 μm and a fines content (<100 μm) of 0.8% by weight. The yield was 1.17 kg/g of supported catalyst. The polymer particles were granular ($M_w$=316,000 g/mol; polydispersity 2.3; $T_m$=146° C.; bulk density 0.31 g/cm$^3$).

EXAMPLE 9

Polymerization using the Supported Catalyst C

The polymerization was carried out using a method similar to Example 2, but using 98 mg of the supported catalyst B and 2 ml of a 1 molar TIBAL/hexane solution. However, unlike the preceding examples, only half of the TIBAL solution was initially charged with 200 g of propylene and the other half was added directly to the supported catalyst in the catalyst feeder; the residence time of the catalyst together with the TIBAL solution prior to metering into the reactor was 5 minutes.

This gave 110 g of polypropylene having a mean particle diameter $d_{50}$ determined by sieve analysis of 400 μm and a fines content (<100 μm) of 0.51% by weight. The yield was 1.12 kg/g of supported catalyst. The polymer particles were granular (bulk density 0.33 g/cm$^3$; $M_w$=339,000 g/mol; polydispersity 2.4; $T_m$=147° C.).

EXAMPLE 10

Polymerization using the Supported Catalyst C

The polymerization was carried out using a method similar to Example 5, but using 508 mg of the supported catalyst C and 7.5 ml of a 1 molar TIBAL/hexane solution in a 20 l reactor. This gave 910 g of polypropylene having a mean particle diameter $d_{50}$ determined by sieve analysis of 400 μm and a fines content (<100 μm) of 0.15% by weight. The activity was 1.8 kg/g of supported catalyst. The polymer particles were granular and free flowing and the reactor showed no wall deposits.

EXAMPLE 11

Preparation of the Supported Catalyst D 3.0 g of the oxide dried at 120° C. (as in Example 7) were suspended in 60 ml of dry toluene in a three-neck flask equipped with a stirrer and two dropping funnels. In the first dropping funnel, 11.3 g (54.4 mmol of Al) of a 30% strength solution of methylaluminoxane in toluene were mixed with 210 ml of toluene and the second dropping funnel was charged with 220 ml of a solution of bisphenol A and oxygen-free toluene (total bisphenol content: 559 mg of bisphenol A; 2.44 mmol). After 20 ml of the MAO solution had been initially introduced into the suspension with moderate stirring, the two solutions were simultaneously added dropwise. The stirrer speed during this procedure was 200 rpm. The rate of dropwise addition was low and was selected such that both solutions were consumed at a suitable decrease in volume. The suspension was subsequently stirred for a further hour and was then allowed to stand. A fine white solid settled out. The supernatant toluene was removed, the residue was again taken up with 180 ml of toluene and washed for 15 minutes at 70° C. The Al content of the washing solution was 0.6 mol % (based on mol of Al used). After removing the supernatant washing solution, a solution comprising 0.136 mmol of dimethylsilanediylbis (2-methylindenyl)zirconium dichloride (from Boulder Scientific Company) and 80 ml of toluene was added. The suspension became orange and this color became increasingly intense during the course of the stirring phase. The mixture was stirred for 8 hours at 70° C., the supernatant clear solution was then removed and the solid was washed again with toluene at 70° C. The residue was subsequently dried at 50° C. under reduced pressure, leaving a red/orange finely divided solid.

EXAMPLE 12

Polymerization using the Supported Catalyst D

The polymerization was carried out using a method similar to Example 2, but using 66 mg of the supported catalyst D and 1.2 ml of a 1 molar TIBAL/hexane solution.

This gave 164 g of polypropylene having a mean particle diameter $d_{50}$ determined by sieve analysis of 400 μm without any fines (<100 μm). The yield was 2.48 kg/g of supported catalyst. The polymer particles were granular ($M_w$=312,000 g/mol; polydispersity 2.4; $T_m$=147° C.; bulk density 0.31 g/cm$^3$).

EXAMPLE 13

Polymerization using the Supported Catalyst D

The polymerization was carried out using a method similar to Example 2, but using 66 mg of the supported catalyst D and 0.8 ml of a 1 molar TIBAL/hexane solution.

This gave 206 g of polypropylene having a mean particle diameter $d_{50}$ determined by sieve analysis of 500 μm without any fines (<100 μm). The yield was 3.12 kg/g of supported catalyst. The polymer particles were granular and free flowing and the reactor showed no wall deposits ($M_w$= 301,000 g/mol; polydispersity 2.3; $T_m$=148° C.).

EXAMPLE 14

Polymerization using the Supported Catalyst D

The polymerization was carried out using a method similar to Example 2, but using 69 mg of the supported catalyst D and 0.6 ml of a 1 molar TIBAL/hexane solution.

This gave 220 g of polypropylene having a mean particle diameter $d_{50}$ determined by sieve analysis of 500 μm without any fines (<100 μm). The yield was 3.18 kg/g of supported catalyst. The polymer particles were granular and free flowing and the reactor showed no wall deposits ($M_w$= 294,000 g/mol; polydispersity 2.4; $T_m$=148° C.).

EXAMPLE 15

Preparation of the Supported Catalyst E

The supported catalyst E was prepared using a method similar to the supported catalyst preparation in Example 1.

3.2 g of the dried oxide were suspended in 80 ml of dry toluene. In the first dropping funnel, 12.16 g (58.5 mmol of Al) of a 30% strength solution of methylaluminoxane in toluene were mixed with 190 ml of toluene and the second dropping funnel was charged with 200 ml of a solution of bisphenol A and toluene (total bisphenol content: 601.5 mg of bisphenol A; 2.63 gel). After 50 ml of the MAO solution had been initially introduced into the suspension with moderate stirring, the two solutions were simultaneously slowly added dropwise. After the reaction was complete, the mixture was stirred for one hour and the solid was subsequently washed twice with toluene. After removing the supernatant washing solution, a solution comprising 0.155 mmol of dimethylsilanediylbis(indenyl)zirconium dichloride (from Witco) and 80 ml of toluene was added. After 6 hours, the stirrer was switched off. After removing the supernatant solution, the solid was again washed with toluene and subsequently dried at 50° C. under reduced pressure.

EXAMPLE 16

Polymerization using the Supported Catalyst E

The polymerization was carried out using a method similar to Example 2, but using 51 mg of the supported catalyst E and 0.4 ml of a 1 molar TIBAL/hexane solution. The polymerization time was 1 hour.

This gave 110 g of polypropylene having a mean particle diameter $d_{50}$ determined by sieve analysis of 400 μm and a fines content (<100 μm) of 0.7% by weight. The yield was 2.16 kg/g of supported catalyst. The polymer particles were granular and free flowing and the reactor showed no wall deposits ($M_w$=40,000 g/mol; polydispersity 2.3; $T_m$=136° C.).

EXAMPLE 17

Preparation of the Supported Catalyst F 3.47 g of the oxide dried as in Example 1 were suspended in 80 ml of dry toluene in a three-neck flask equipped with a stirrer and two dropping funnels. In the first dropping funnel, 13.28 g (63.5 mmol of Al) of a 30% strength solution of methylaluminoxane in toluene were mixed with 187 ml of toluene and the second dropping funnel was charged with 201 ml of a saturated solution of bisphenol A and oxygen-free toluene (total bisphenol content: 655 mg of bisphenol A; 2.87 mmol). The two solutions were then simultaneously added dropwise. The stirrer speed during this procedure was 200 rpm. The rate of dropwise addition was low and was selected such that both solutions were consumed at a suitable decrease in volume. The suspension was subsequently stirred for a further hour and was then allowed to stand. A fine white solid settled out. The supernatant toluene was removed, the residue was again taken up with toluene and washed for 15 minutes at 70° C. After removing the supernatant washing solution, a solution comprising 0.196 mmol of bis(trimethylsilyl)silanediylbis(2-methylindenyl) zirconium dichloride (prepared as described in German Application 195 27 047) and 60 ml of toluene was added. The suspension became orange and this color became increasingly intense during the course of the stirring phase. After 8 hours, the stirrer was switched off and the supernatant clear solution no longer showed any discoloration. Removal of the solvent at 50° C. under reduced pressure gave red/orange finely divided solid.

EXAMPLE 18

Polymerization using Supported Catalyst F

A 2 l stirred reactor (from Büchi) was, after being made inert, charged at room temperature with 1.2 ml of a 1 molar triisobutylaluminum/hexane solution and 200 g of liquid propylene and the mixture was stirred for 3 minutes at 350 rpm.

101 mg of the supported catalyst F prepared in Example 17 were rinsed into the reactor using a further 300 g of propylene, the stirrer speed was increased to 700 rpm, the mixture was heated over a period of 15 minutes to the polymerization temperature of 70° C. and the temperature was kept constant. The reaction was stopped after two hours by flashing off the propylene. This gave 260 g of polypropylene having a mean particle diameter $d_{50}$ determined by sieve analysis of 315 μm and a fines content (<100 μm) of 4% by weight. The activity was 2.6 kg/g of supported catalyst. The polymer particles were granular ($M_w$=380,000 g/mol; polydispersity 2.4; $T_m$=147° C.) and the reactor showed no wall deposits.

We claim:

1. A process for preparing a catalyst support, which comprises the following steps:

a) drying a hydrophilic inorganic oxide of an element of Groups IIa to IVa or transition Group IVb of the Periodic Table or a mixture of said oxides or their mixed oxides at from 100 to 800° C., subsequently b) optionally reacting the free hydroxyl groups of the oxide completely or partially with alumoxanes or aluminum alkyls, and subsequently c) reacting the oxide simultaneously with alumoxanes and bisphenol A.

2. The process as claimed in claim 1, wherein an aluminum oxide, silicon oxide, magnesium oxide, titanium oxide or zirconium oxide or a mixture of said oxides or their mixed oxides is used in step a).

3. A catalyst support based on a hydrophilic inorganic oxide of an element of Groups IIa to IVa or transition Group IVb of the Periodic Table or a mixture of said oxides or their mixed oxides, which catalyst support is obtained by simultaneous reacting with alumoxanes and with bisphenol A.

* * * * *